Patented Oct. 6, 1936

2,056,261

UNITED STATES PATENT OFFICE 2,056,261

MANUFACTURE OF PARA-CHLORO-ORTHO-NITRO-ANISOLE

Miles Augustinus Dahlen and Elmer Ellsworth Fleck, Wilmington, Del., assignors to E. I. du Pont de Nemours & Company, Wilmington, Del., a corporation of Delaware No Drawing. Application December 7, 1935, Serial No. 53,426

3 Claims. (Cl. 260—143)

A. This invention relates to a method for preparing 4-chloro-2-nitro-anisole, hereinafter designated as para-chloro-ortho-nitro-anisole, a substance which is known and has been used in industry. It has been prepared by dissolving nitro-para-dichloro-benzene in methanol, heating the solution to a boil, and adding caustic alkali.

B. The procedure, as described by Brand and Pabst, J. Pr. (2) 120 205 (1929), states that the reaction is exceedingly exothermic, and is accompanied by vigorous boiling, producing material contaminated with potassium chloride, and which must be purified to remove unchanged nitro-para-dichloro-benzene.

C. In copending application, Serial No. 46,868, filed October 26, 1935, there is described an improved process of making ortho-nitro-anisole. We have discovered that the said improved process may be applied to the making of para-chloro-ortho-nitro-anisole. When nitro-para-dichloro-benzene is reacted with methyl alcohol and caustic the product is 1-methoxy-2-nitro-4-chloro-benzene, and so far as we have been able to determine is never 4-methoxy or dimethoxy.

D. It is an object of our invention to improve the process of manufacturing para-chloro-ortho-nitro-anisole from nitro-para-dichloro-benzene by reaction with methyl alcohol and alkali. Another object of the invention is to eliminate from the process deleterious side reactions and dangers which attended the operation of the old process. Another object of the invention is to prepare a superior grade of para-chloro-ortho-nitro-anisole.

E. The objects of this invention are accomplished, generally speaking, by reacting nitro-para-dichloro-benzene with methyl alcohol in the presence of caustic alkali, the concentration of the caustic alkali at the start being less than that at which deleterious side reactions or temperatures are evolved, and the addition to the reaction mass of caustic alkali during the process being at substantially the rate of consumption.

F. The reaction mass may be considered a three component system, containing nitro-para-dichloro-benzene, methyl alcohol, and alkali. We have discovered that, at any given reaction temperature, with a given ratio of nitro-para-dichloro-benzene to methyl alcohol, there is an upper limit of alkali concentration which must not be exceeded if undesirable side reactions are to be avoided. However, with the factors of temperature and nitro-para-dichloro-benzene-methyl alcohol ratio being held constant, the velocity of the reaction is markedly affected by the alkali concentration, and to attain an optimum rate of reaction the alkali concentration should be held not too far below that at which excessive side reactions appear.

G. In carrying out the reaction, the reaction vessel is charged with nitro-para-dichloro-benzene, methyl alcohol, and sufficient caustic alkali to give the desired concentration; the reaction mass is agitated and heated to a preferred temperature, and a strong solution of caustic alkali is added at a rate that produces the most favorable concentration at each stage of the process. When the reaction is complete, the product may be isolated by any standard procedure. The excess alkali may, for example, be nearly neutralized with dilute sulfuric acid, the excess alcohol removed by distillation, and the product washed with water to remove the salt and any water soluble impurities which may be contained. The product separates as an oily layer or a crystalline solid, depending on the temperature, and is of exceptional purity.

H. The material of which the reaction vessel is made has a distinct effect on the process, some materials inducing undesirable side reactions. Glass or other siliceous materials, such as silicate-enamelled metal, have no appreciable effect on the reaction. Nickel is also a valuable material, ranking but little below the siliceous materials in this respect. Copper and alloys such as bronze, Monel metal, and the so-called "stainless" steels are of a lower order, but exercise only a small adverse effect. Iron and steel both affect the reaction deleteriously, apparently by catalyzing the reduction of the nitro body; when the reaction is carried out in equipment of that type under standard conditions, the product is highly colored, high in chlorine content, and poor in quality. If useful products are to be obtained, much milder reaction conditions must be used in such vessels.

I. In the following examples, which illustrate but do not limit the invention, the alkali concentration is expressed in terms of normality, which means the concentration of alkali in equivalent units per liter of reaction mass at the reaction temperature. Normality may be evaluated by this equation:

$$N = \frac{1000W}{VM}$$

where: N is the normality,
W is the weight of alkali in any volume V of solution at reaction temperature, and
M is the weight of one equivalent of alkali. For bases such as sodium or potassium hydroxide this is the molecular weight.

All quantities are parts by weight, and the methyl alcohol strengths are given as percent by weight.

Example I 672 parts of 95% methyl alcohol, 17 parts of solid sodium hydroxide (95% purity) and 192 parts of nitro-para-dichloro-benzene are added to a copper reaction vessel fitted with agitation, a reflux condenser and coils for heating or cooling. The temperature is raised to 68° C. An aqueous solution of sodium hydroxide of 45% strength is added as required to maintain the alkali concentration at 0.5 N. At the end of 12 hours, sulfuric acid of 25% strength is added until the mass is alkaline to brilliant yellow but neutral to cresol phthalein. Methanol is distilled off until the temperature of the liquid in the still is 105° C. Then 400 parts of hot (90–100° C.) water is added. The reaction mass is cooled under agitation to 30° C. The para-chloro-o-nitro-anisole is separated by filtration, washed with water and dried. The product has a freezing point of about 96° C. and is obtained in a yield of about 95% of the theoretical.

Example II 672 parts of 95% methanol, 27 parts of solid caustic soda of 95% strength and 192 parts of nitro-para-dichloro-benzene were added to a reaction vessel as described in Example I. The temperature was raised to 68° C. An aqueous solution of sodium hydroxide of 45% strength then was added as required to maintain the alkali concentration at 0.8 N. The reaction was complete in three hours. The charge then was neutralized and the product isolated by the method described in Example I. The product had a freezing point of 92° C. and the yield was about 90% of the theoretical.

J. Many modifications may be made in the process without departing from the spirit of the invention: Any strong base, for instance potassium hydroxide, may replace wholly or in part the sodium hydroxide; the ratio of methanol to nitro-para-dichloro-benzene may be varied within wide limits, but it will be found that the higher this ratio the slower the rate of reaction under identical conditions of temperature and alkali concentrations; when the concentration of other reactants and the temperature are held constant, the higher the alkali concentration the more rapid is the condensation; the temperature at which the reaction is carried out may be varied, but the lower the temperature the slower condensation so temperatures near boiling are preferred. In our process it is possible to carry out the reaction at temperatures near boiling without the danger which accompanied attempts to carry out the older process because the close control which is kept over the addition of alkali prevents the violent and dangerous reactions which made the older process unsatisfactory for plant use.

K. Our preferred conditions comprehend a ratio of about one part nitro-p-dichloro benzene to between three and four parts of methanol, temperatures between 68 and 71° C. and alkali concentrations of 0.25 to 1 N.

L. Any satisfactory method of isolating the product may be adopted. Among such methods are crystallization of the product by cooling the reaction mass, and fractional distillation of the neutralized reaction mass, and the one described in the examples.

M. The product of this reaction is used in the manufacture of dyes.

N. The process has over the method of Brand and Pabst the following advantages: Sodium hydroxide is substituted for the more expensive potassium hydroxide used by those investigators, a substitution made possible by the close control which we keep of the reaction; the addition of the alkali in the form of a strong aqueous solution instead of the more expensive and less convenient solution in methanol has both technical and financial advantage; a positive control of the rate of reaction is obtained by the use of specific alkali concentrations which are maintained throughout the process; and there is no hazard in manufacturing a large batch of material, despite the highly exothermic nature of the reaction.

O. As many apparently widely different embodiments of this invention may be made without departing from the spirit and scope thereof, it is to be understood that we do not limit ourselves to the specific embodiments thereof except as defined by the appended claims.

We claim:

1. The process which comprises heating for about twelve hours at about 68° C. in a copper reaction vessel about 672 parts of 95% methyl alcohol, about 192 parts of nitro-para-dichloro-benzene and about 17 parts of solid sodium hydroxide 95% pure, adding a 45% sodium hydroxide solution as required to maintain the alkali concentration at .5 N, neutralizing the excess sodium hydroxide, and isolating the product.

2. The process which comprises heating at about 68° C. in a siliceous reaction vessel a mixture of methyl alcohol, nitro-para-dichloro-benzene and sodium hydroxide, the sodium hydroxide, being in an amount to constitute in the mixture a solution of about .5 N, and adding to the mixture the sodium hydroxide aqueous solution at substantially the rate at which the sodium hydroxide is used in reaction.

3. The method which comprises heating methyl alcohol, nitro-para-dichloro-benzene and sodium hydroxide, the concentration of alkali at the start of the reaction being beneath that at which undesirable side reactions and excessive temperatures are evolved, and in which alkali is added during the course of the reaction at substantially the rate at which it is used.

MILES AUGUSTINUS DAHLEN.
ELMER ELLSWORTH FLECK.